(12) United States Patent
Wang et al.

(10) Patent No.: US 12,443,643 B1
(45) Date of Patent: Oct. 14, 2025

(54) METHODS, DEVICES, AND SYSTEMS FOR EXTRACTING AND ANALYZING CONTENT FACING LARGE MODEL

(71) Applicant: INSTITUTE OF NETWORK TECHNOLOGY (YANTAI), Shandong (CN)

(72) Inventors: Haiyang Wang, Yantai (CN); Zhihua Yu, Yantai (CN); Qirong Zhou, Yantai (CN); Qiang Qiu, Yantai (CN); Jie Chu, Yantai (CN); Shenqiang Wang, Yantai (CN); Zhen Zhao, Yantai (CN)

(73) Assignee: INSTITUTE OF NETWORK TECHNOLOGY (YANTAI), Yantai (CN)

( * ) Notice: Subject to any disclaimer, the term of this patent is extended or adjusted under 35 U.S.C. 154(b) by 0 days.

(21) Appl. No.: 19/192,328

(22) Filed: Apr. 28, 2025

(30) Foreign Application Priority Data

Jan. 21, 2025 (CN) .......................... 202510088849.7

(51) Int. Cl.
  *G06F 16/35* (2025.01)
  *G06F 40/117* (2020.01)
(52) U.S. Cl.
  CPC ............ *G06F 16/35* (2019.01); *G06F 40/117* (2020.01)
(58) Field of Classification Search
  CPC ............................... G06F 16/35; G06F 40/117
  USPC .......................................................... 704/9
  See application file for complete search history.

(56) References Cited

U.S. PATENT DOCUMENTS

2022/0138424 A1   5/2022  Gong et al.

FOREIGN PATENT DOCUMENTS

| CN | 109800307 A | 5/2019 |
| CN | 115687606 A | 2/2023 |
| CN | 116150349 A | 5/2023 |
| CN | 116720515 A | 9/2023 |
| CN | 118821191 A | 10/2024 |
| WO | 2021073271 A1 | 4/2021 |

OTHER PUBLICATIONS

Wang, Shaomin et al., Research on Fusion Model Based on Deep Learning for Text Content Security Enhancement, Telecommunications Science, 5: 25-30, 2020.
First Office Action in Chinese Application No. 202510088849.7 mailed on Mar. 6, 2025, 12 pages.
Decision to Grant a Patent in Chinese Application No. 202510088849.7 mailed on Apr. 22, 2025, 4 pages.

*Primary Examiner* — Thierry L Pham
(74) *Attorney, Agent, or Firm* — PORUS IP LLC (57) ABSTRACT

A method, device, and system for extracting and analyzing content facing a large model are provided. The method comprises: by preprocessing a current text generated by the large model, obtaining a plurality of word vectors of the current text, the large model being a machine learning model; by clustering the plurality of word vectors according to an importance degree of the plurality of word vectors, obtaining a plurality of word cluster centers; and determining whether the current text is compliant based on the plurality of word cluster centers and a sensitive word database.

9 Claims, 8 Drawing Sheets

METHODS, DEVICES, AND SYSTEMS FOR EXTRACTING AND ANALYZING CONTENT FACING LARGE MODEL

CROSS REFERENCE TO RELATED APPLICATIONS

This application claims priority to Chinese Patent Application No. 202510088849.7, filed on Jan. 21, 2025, the entire contents of which are incorporated herein by reference.

TECHNICAL FIELD

The present disclosure relates to the field of data processing technology, and specifically relates to a method, device, and system for extracting and analyzing content facing a large model.

BACKGROUND

A large model is a machine learning model with large-scale parameters and a complex computational structure, which is typically built by deep neural networks with billions or even hundreds of billions of parameters. The large model has a wide range of applications in a variety of domains, including a natural language processing, a computer vision, a speech recognition, a recommender system, or the like. The large model is trained on massive amounts of data to learn complex patterns and features, and has a strong generalization capability that allows the large model to make accurate predictions on unseen data.

As text model training data and parameters continue to expand, especially when training data is not analyzed in its entirety, the model is more likely to exhibit some unpredicted and more complex capabilities, which may generate inappropriate informational content, affect user experience, and cause an unnecessary risk. Thus, extracting and analyzing the content generated by the large model is an important way to ensure that the model-generated content is accurate and free from bad guidance. However, directly comparing words of the model-generated content, a structure feature of the content generated by the large model is likely to be ignored, which causes situations of a false detection or a missed detection.

SUMMARY

To solve the above problem, embodiments of the present disclosure provide a method, device, and system for extracting and analyzing content facing a large model.

The method for extracting and analyzing content facing a large model provided by embodiments of the present disclosure includes: by preprocessing a current text generated by the large model, obtaining a plurality of word vectors of the current text, the large model being a machine learning model; by clustering the plurality of word vectors according to an importance degree of the plurality of word vectors, obtaining a plurality of word cluster centers; and determining whether the current text is compliant based on the plurality of word type cluster centers and a sensitive word database.

A device for extracting and analyzing content facing a large model provided by embodiments of the present disclosure includes: a first obtaining module configured to obtain a plurality of word vectors of the current text by preprocessing a current text generated by the large model, the large model being a machine learning model; a second obtaining module configured to obtain a plurality of word cluster centers by clustering the plurality of word vectors according to an importance degree of the plurality of word vectors; and a determination module configured to determine whether the current text is compliant based on the plurality of word type cluster centers and a sensitive word database.

A system for extracting and analyzing content facing a large model provided by embodiments of the present disclosure includes a server including a memory storing a computer program; and a processor configured to perform the computer program in the memory to implement operations of the method for extracting and analyzing content facing a large model.

BRIEF DESCRIPTION OF THE DRAWINGS

The present disclosure is further illustrated in terms of exemplary embodiments. These exemplary embodiments are described in detail with reference to the drawings. These embodiments are not limiting, and in these embodiments, the same numbering denotes the same structure, wherein.

DETAILED DESCRIPTION

To be able to clearly illustrate the present disclosure, the present disclosure is hereinafter elaborated by way of specific embodiments and in conjunction with the accompanying drawings.

Embodiments of the present disclosure will be described in greater detail below with reference to the accompanying drawings. While certain embodiments of the present disclosure are shown in the accompanying drawings, it should be appreciated, however, that the present disclosure may be accomplished in a variety of forms and should not be construed as being limited to the embodiments set forth herein, but rather these embodiments are provided for a more thorough and complete understanding of the present disclosure. It should be understood that the accompanying drawings and embodiments of the present disclosure are intended to be exemplary only and are not intended to limit the scope of protection of the present disclosure.

It should be appreciated that the individual operations documented in the method embodiments of the present disclosure may be performed in a different order, and/or in parallel. In addition, the embodiments may include additional operations and/or omit the illustrated operations. The scope of the present disclosure is not limited in this regard.

The term "includes" and variations thereof, as used herein, is open-ended, i.e., "includes, but not limited to." The term "based on" is "at least partially based on." The term "one embodiment" means "at least one embodiment;" the term "another embodiment" means "at least one additional embodiment;" and the term "some embodiments" means "at least some embodiments." Related definitions of other terms will be given in the description below.

It should be noted that the concepts of "first" and "second" mentioned in the present disclosure are only used to distinguish between different devices, modules or units, and are not intended to define the order or interdependence of the functions performed by these devices, modules, or units.

It should be noted that references to "one" and "more than one" in the present disclosure are exemplary and not restrictive, and those skilled in the art should understand that they should be understood as "one or more" unless otherwise expressly indicated in the context. In the description of the present disclosure, unless otherwise indicated, "plurality" means two or more, and other quantifiers are similar; "at least one (one)," "one or more" or similar expressions refer to any combination of these item(s), including any combination of single item or plural items. For example, at least one means any count of a. For another example, one or more of a, b, and c means: a, b, c, a-b, a-c, b-c, or a-b-c, where a, b, and c are singular or plural; "and/or" is a way of describing the association relationship of associated objects, indicating that three kinds of relationships exist. For another example, A and/or B means A alone, both A and B, and B alone, where A and B may be singular or plural.

While in the embodiments of the present disclosure, operations are described in the accompanying drawings in a particular order, they should not be construed as requiring the operations to be performed in the particular order shown, or as requiring that all of the shown operations or operations to be performed to obtain a desired result. In embodiments of the present disclosure, the operations are performed serially; they may be performed in parallel; and a portion of the operations may be performed.

At the same time, it is understood that the data involved in this technical solution (including, but not limited to, the data itself, the obtaining or the use of the data) shall comply with the requirements of the corresponding laws and regulations and relevant provisions.

First, the scenarios for the application of the present disclosure are explained. A generative big language model encodes input units as a vector after receiving an input or a context from a user and transforming the input into an input format of the model, then processes the information using a self-attention mechanism, a multi-layer coding, a positional coding, or the like, and recursively generates a final text based on an context modeling through different strategies (e.g., a greedy decoding, a bundle search, a temperature control, etc.). Then, the generated text is post-processed to ensure quality, accuracy, and appropriateness of the content. The scenarios optimized by the method are mainly aimed at a processing phase after generating text.

In a process of running the large model, after obtaining and analyzing a user input text, the large model outputs a corresponding response text. As the large model has been trained with ultra-large-scale data, realistic text information is generated, and according to the input text content, some undesirable information may be generated at times. To minimize an impact of the above condition, before the model-generated content is sent, the generated content may be extracted and analyzed to determine its compliance. However, directly comparing words of the model-generated content, a structure feature of the content generated by the large model is likely to be ignored, which causes situations of a false detection or a missed detection. Therefore, there is an urgent need for a new method for extracting and analyzing content facing a large model. The present disclosure is described below in connection with specific embodiments.

Figure 1:
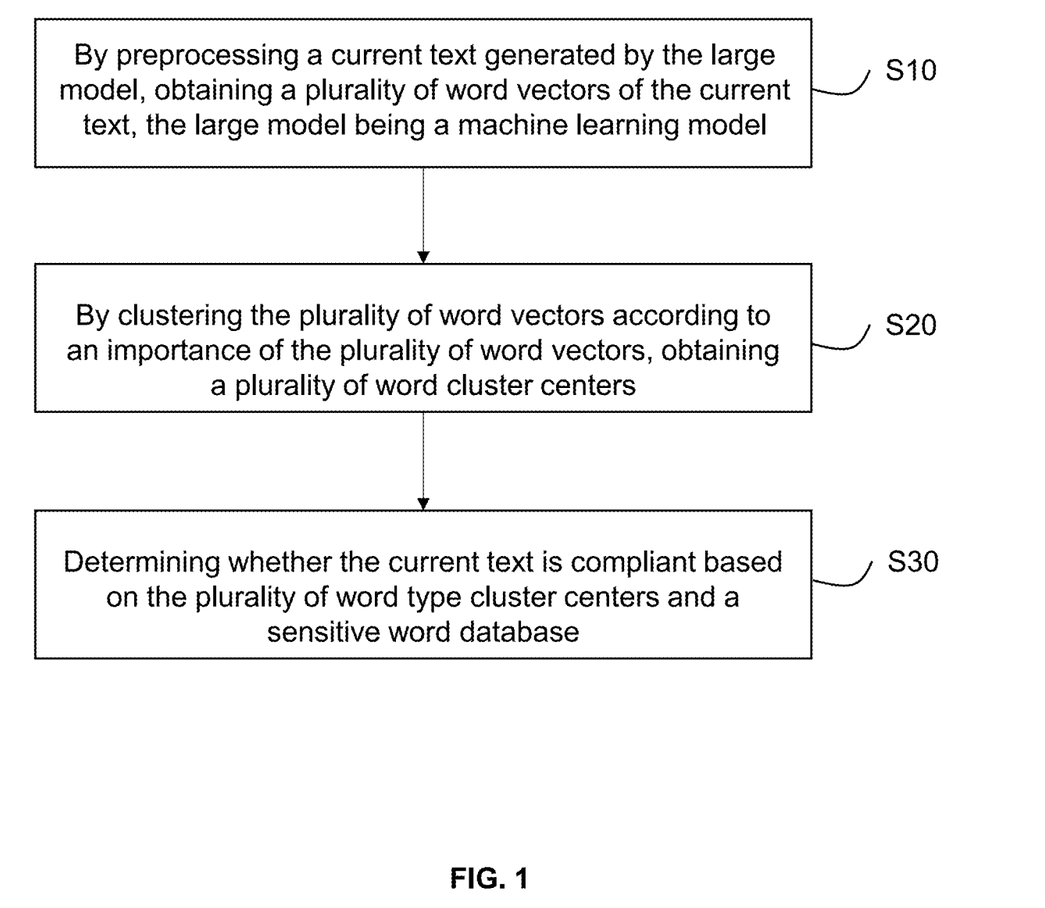
FIG. 1 is a flowchart illustrating an exemplary method for extracting and analyzing content facing a large model according to some embodiments of the present disclosure.

FIG. 1 is a flowchart illustrating an exemplary method for extracting and analyzing content facing a large model according to some embodiments of the present disclosure. As shown in FIG. 1, embodiments of the present disclosure provide a method for extracting and analyzing content facing a large model performed by a processor. The method may include the following operations.

In S10, by preprocessing a current text generated by the large model, a plurality of word vectors of the current text are obtained.

In some embodiments, the large model is a machine learning model.

In this operation, the current text generated by the large model is preprocessed, and the processor may obtain a plurality of word vectors for the current text. Exemplarily, the processor uses a word algorithm (e.g., a jieba module, etc.) to perform a word processing on the text; and uses a word vector transformation manner (e.g., a word2vec model, etc.) to transform the processing result into a vector form, so as to obtain a plurality of word vectors of the current text.

In S20, by clustering the plurality of word vectors according to an importance of the plurality of word vectors, a plurality of word cluster centers are obtained.

In this operation, the processor clusters the plurality of word vectors based on the importance of the plurality of word vectors to obtain the plurality of word cluster centers. The importance of the word vector refers to an occurrence condition of the word vector in a plurality of different levels of paragraphs. The more count of occurrences of the word vector in paragraphs with a higher level, the higher the importance. For example, the processor determines a weighted count of occurrences of the word vector based on a count of occurrences of the word vector in the different levels of paragraphs, and designates the weighted count of occurrences as the importance of the word vector. The processor then determines a similarity of any two word vectors based on the importance of the word vectors, and finally clusters the current text based on the similarity to obtain the plurality of word cluster centers. For another example, the processor first determines a paragraph tag of the word vector based on a paragraph position relationship of the current text, and then, determines a describing density of the word vector based on the paragraph tag, and determines a structure distribution parameter of the word vector. Then the processor determines a text positioning coefficient of the word vector based on the describing density and the structure distribution parameter. After that, the processor determines a similarity of any two of the plurality of word vectors based on a plurality of text positioning coefficients of the plurality of word vectors; and finally, by clustering the plurality of word vectors based on the similarity, the processor obtains the plurality of word cluster centers, more descriptions may be found in FIG. 2 and the related descriptions.

In S30, whether the current text is compliant is determined based on the plurality of word type cluster centers and a sensitive word database.

In this operation, the processor determines whether the current text is compliant based on the plurality of word type cluster centers and a sensitive word database. The sensitive database refers to a database containing sensitive words such as political, illegal, and other sensitive words. The sensitive database may be used for content auditing, filtering, or monitoring. Exemplarily, the processor obtains a publicly available sensitive word database through a network, and/or formulates a suitable sensitive word rule in accordance with its own business needs and in conjunction with laws and regulations (e.g., Cybersecurity Law and rules on Internet information service requirements). In some embodiments, the processor determines a vector distance between a sensitive word vector of the sensitive word in the sensitive word database and the plurality of word type cluster centers. When the vector distance does not satisfy a distance condition (e.g., the distance condition is that the vector distance is less than a preset threshold), the processor determines that the current text is non-compliant. In some embodiments, the processor first converts the sensitive words in the sensitive word database into a sensitive word vector, and then determine a modified cosine similarity of the sensitive word vector and each of the plurality of word cluster centers, and then in response to determining that the modified cosine similarity does not satisfy a preset condition, determining that the current text is non-compliant and instructing the large model to re-generate an updated text, more descriptions may be found in FIG. 9 and the related descriptions.

The embodiment of the present disclosure determines whether the current text is compliant by clustering the word vectors according to the importance, and then combines the word cluster centers obtained by clustering with the sensitive database to determine whether the current text is compliant. In this way, the occurrences of the false detection or the missed detection are reduced, thereby improving an accuracy of the detection result.

Figure 2:
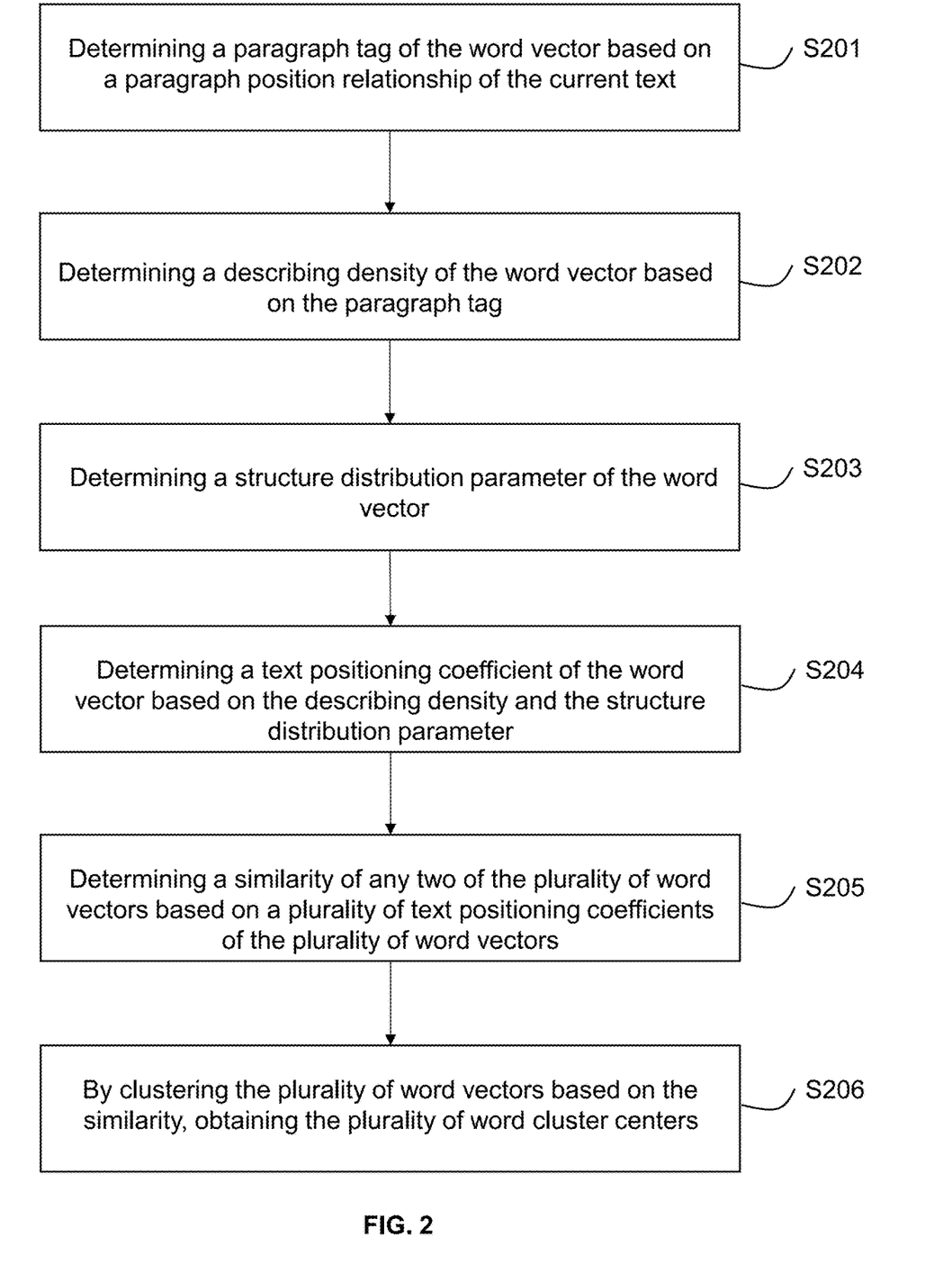
FIG. 2 is a flowchart illustrating a process for obtaining a plurality of word cluster centers according to some embodiments of the present disclosure.

FIG. 2 is an exemplary flowchart illustrating a process for obtaining a plurality of word cluster centers according to some embodiments of the present disclosure. As shown in FIG. 2, the obtaining a plurality of word cluster centers may include the following operations.

For each of the plurality of word vectors, the processor may perform operations S201-S204.

In S201, a paragraph tag of the word vector is determined based on a paragraph position relationship of the current text.

In this operation, a paragraph tag of the word vector is determined based on a paragraph position relationship of the current text. The paragraph position relationship refers to a paragraph level situation in the text. For example, the paragraph level includes 3 levels. A paragraph level 1 is followed by a paragraph level 2 and a paragraph level 3. The processor determines a level to which the plurality of paragraphs belong based on a first line indentation or paragraph tag of the plurality of paragraphs. The paragraph tag refers to a tag used to describe the paragraph level. For example, in a situation where there are 3 levels of paragraphs in the current text, the paragraph tag for the paragraph level 1 is 001 or 1, the paragraph tag for the paragraph level 2 is 011 or 1-1, or the like. In some embodiments, the processor first obtains the first line indentation of a plurality of paragraphs of the current text, obtains a describing type of the plurality of paragraphs based on the first line indentation, and obtains a text structure of the current text based on the describing type; the processor obtains the paragraph tag of the word vector based on the text structure, more descriptions may be found in FIGS. 3-4 and the related instructions.

In S202, a describing density of the word vector is determined based on the paragraph tag.

In this operation, the describing density of the word vector is determined based on the paragraph tag. The describing density refers to a comprehensive situation of the count of times the word vector appears in a plurality of paragraph levels of the text, and the count of times the word vector appears with an adjacent word vector at the same time. The processor may determine the describing density of the word vector based on the count of times the word vector appears in the plurality of paragraph levels of the current text and the count of times the word vector appears with the adjacent word vector at the same time. Exemplarily, the processor determines a generalized importance degree of the word vector, and then determines an information entropy of the word vector, and then determines the describing density of the word vector based on the generalized importance degree and the information entropy, more descriptions may be found in FIG. 5 and related descriptions.

In S203, a structure distribution parameter of the word vector is determined.

In this operation, the structure distribution parameter of the word vector is determined. The structure distribution parameter refers to a sum of products between a level sum and a level difference of any adjacent word of the word vector. The processor determines the structure distribution parameter of the word vector based on a sum of products of a sum and a difference of paragraph levels where each word vector and the adjacent word vector are located. Exemplarily, the processor determines an adjusted Euclidean norm for the word vector, determines a text distance of the word vector, and determines the structure distribution parameter of the word vector based on the adjusted Euclidean norm and the text distance, more descriptions may be referred to in FIG. 6 and the related descriptions.

In S204, a text positioning coefficient of the word vector is determined based on the describing density and the structure distribution parameter.

In this operation, the text positioning coefficient of the word vector is determined based on the describing density and the structure distribution parameter. The text positioning coefficient refers to a combination parameter of the count of times the word vector appears in a plurality of paragraphs in the text, a spacing condition of the plurality of paragraphs in which the word vector is located, an association condition of the word vector and the adjacent word vector, and a ranking condition of the word vector in the plurality of word vector parameters. The processor determines a text positioning coefficient based on the structure distribution parameter and the ranking of the word vector. Exemplarily, the processor obtains a first ranking of the word vector, wherein the first ranking of the word vector refers to a sorting order of the word vector in a structure distribution parameter sequence. The structure distribution parameter sequence is obtained by arranging the structure distribution parameters of a plurality of word vectors of the current text sequentially. Then a second ranking of the word vector is obtained, wherein the second ranking refers to a sorting order of the word vector in a describing density sequence. The describing density sequence is obtained by arranging the describing densities of the plurality of word vectors of the current text sequentially. Then, according to the first ranking, the second ranking, the describing density, and the structure distribution parameter, the text positioning coefficient of the word vector is determined.

By performing the above operations S201 to S204 for a plurality of times, the processor may obtain a plurality of text positioning coefficients of the plurality of word vectors. The processor may obtain the plurality of word cluster centers according to operations S205 to S206 below.

In operation S205, a similarity of the any two of the plurality of word vectors is determined based on the plurality of text positioning coefficients of the plurality of word vectors.

In this operation, a similarity of the any two word vectors is determined based on the text positioning coefficient. The processor may determine the similarity of any two word vectors based on a sum of the vector distance of the any two word vectors and a distance between the text positioning coefficients of the any two word vectors. Exemplarily, the processor determines the Euclidean distance between any two word vectors, and determines the similarity of the any two word vectors based on the text positioning coefficients and the Euclidean distance of the any two word vectors, more descriptions may be found in FIG. 8 and the related descriptions.

In operation S206, the plurality of word vectors are clustered according to the similarity to obtain the plurality of word cluster centers.

In this operation, the plurality of word vectors are clustered based on the similarity of any two word vectors to obtain the plurality of word cluster centers. There may be various manners of clustering the plurality of word vectors of the current text. For example, the processor clusters the plurality of word vectors in the current text using algorithms such as a K-means clustering algorithm to obtain the plurality of word cluster centers.

Figure 3:
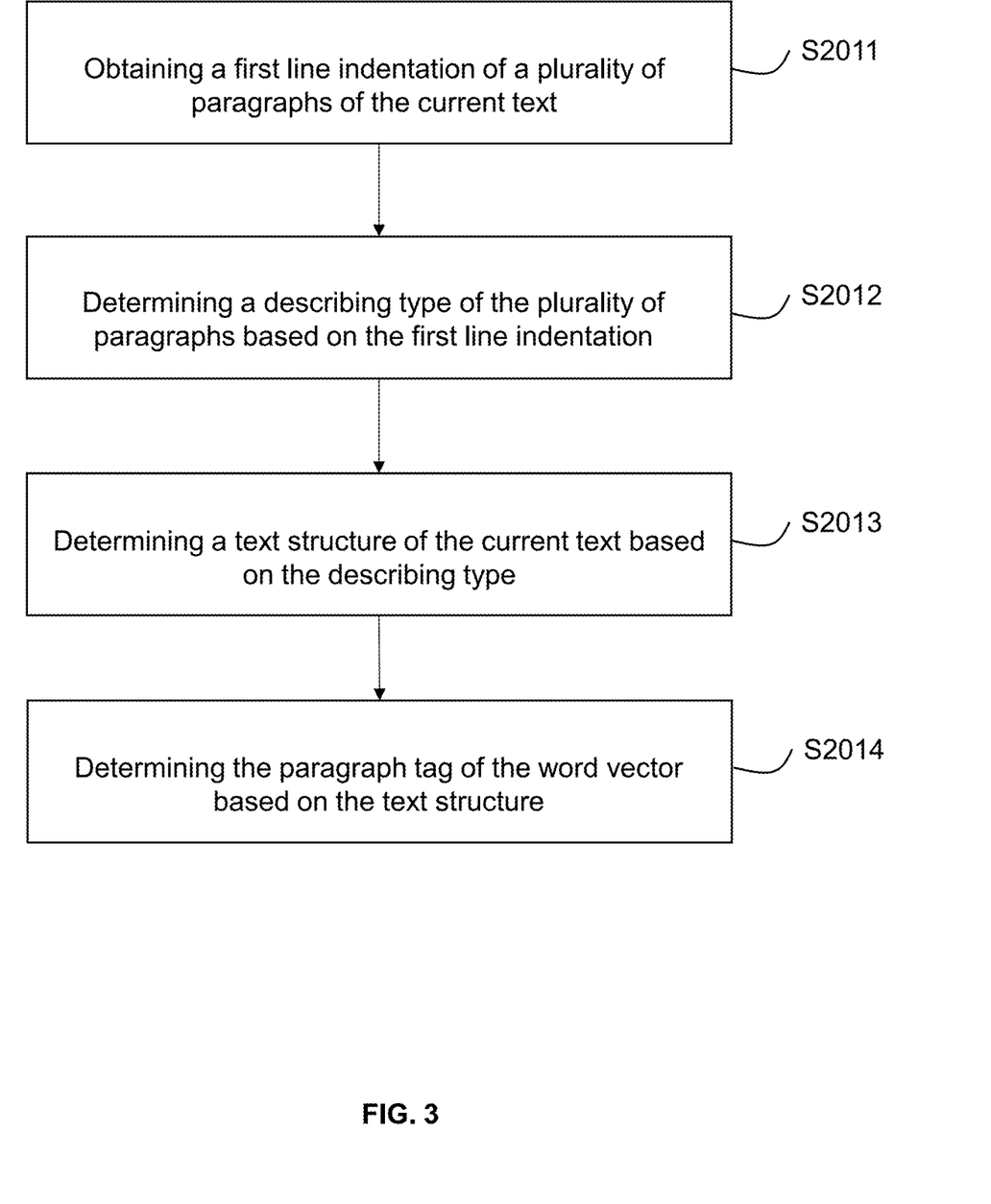
FIG. 3 is a flowchart illustrating an exemplary process for determining a paragraph tag of a word vector according to some embodiments of the present disclosure.

FIG. 3 is a flowchart illustrating an exemplary process for determining a paragraph tag of a word vector according to some embodiments of the present disclosure. As shown in FIG. 3, the determining a paragraph tag of a word vector based on based on a paragraph position relationship of the current text may include the following operations.

In S2011, a first line indentation of a plurality of paragraphs of the current text is obtained.

In this operation, the first line indentation of a plurality of paragraphs of the current text is obtained. Exemplarily, a line break in the current text is recognized and the current text is segmented according to a position of the line break, and then the first line indentation of the plurality of paragraphs is calculated.

In S2012, a describing type of the plurality of paragraphs is determined based on the first line indentation.

In this operation, the describing type of the plurality of paragraphs is determined based on the first line indentation. The describing type refers to a level description corresponding to the paragraph. Exemplarily, the processor divides a text paragraph into various describing types according to the first line indent. Paragraphs with the same first-line indentation are in a same describing type. The plurality of describing types are referred to as a first describing type, a second describing type, or the like, in order of first line indentation from smallest to largest.

In S2013, a text structure of the current text is determined based on the describing type.

In this operation, the text structure of the current text is determined based on the describing type. The text structure refers to a sum of level descriptions of all paragraphs in the current text. Exemplarily, for a text with a structure feature "general-specific-general", a paragraph with relatively great indentation is usually detailed descriptions of the level to which it belongs, so structure information representing the current text may be extracted in a way similar to a forest structure.

In some embodiments, the processor uses a paragraph with the smallest first line indentation in the describing type as a root node. The current text is divided into multiple blocks according to a position of the root node in the text description. For the text block corresponding to each root node, the second describing type, the third describing type (and so on) of the text block are taken as a second level sub-node and a third level sub-node (and so on), respectively. A parent node of the nth level sub-node may be a nearest n−1 st describing type upward from the corresponding paragraph of the sub-node in the text. Sub-nodes of the same parent node are listed in a top-down order by text. The nodes of each level are arranged in a top-down order by text to obtain the text structure of the current text in the forest structure.

In S2014, the paragraph tag of the word vector is determined based on the text structure.

In this operation, a segment label for the word vectors is determined based on the text structure. Exemplarily, the processor numbers the plurality of sub-nodes of the same parent node in the forest structure. The processor numbers the plurality of sub-nodes as 1, 2, 3, . . . , etc., in order. For the root node, the processor sets the numbering 1, 2, 3, . . . , etc. in a tree sort order. For any node, a traversal number of the node is each digit of number traversed from the root node of the tree which the node belongs to the node (a count of digits is a count of nodes traversed), and then the greatest digit number is designated as a count of digits of the paragraph tag. For a node whose traversal number digit is less than a tag digit (the maximum number digit for the traversal of the text structure), 0 is added after the number until the number digit equals the tag digit, and then the number is used as the paragraph tag of the current node. The paragraph tags of the words in the corresponding paragraph of the node are all the paragraph tags of the node.

Figure 4:
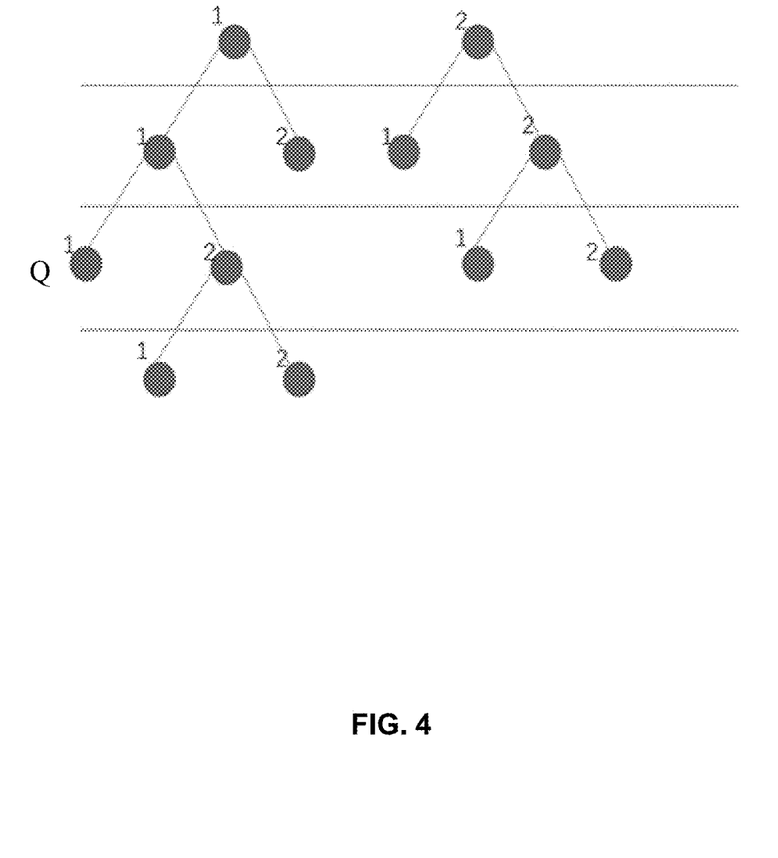
FIG. 4 is a schematic diagram illustrating a paragraph tag according to some embodiments of the present disclosure.

FIG. 4 is a schematic diagram illustrating a paragraph tag according to some embodiments of the present disclosure. As shown in FIG. 4, a form of binary tree is selected for the convenience of demonstration, and an actual construction process may be a multi-branch tree, and a next deepest leftmost node Q, for example, has a paragraph tag 1110.

Figure 5:
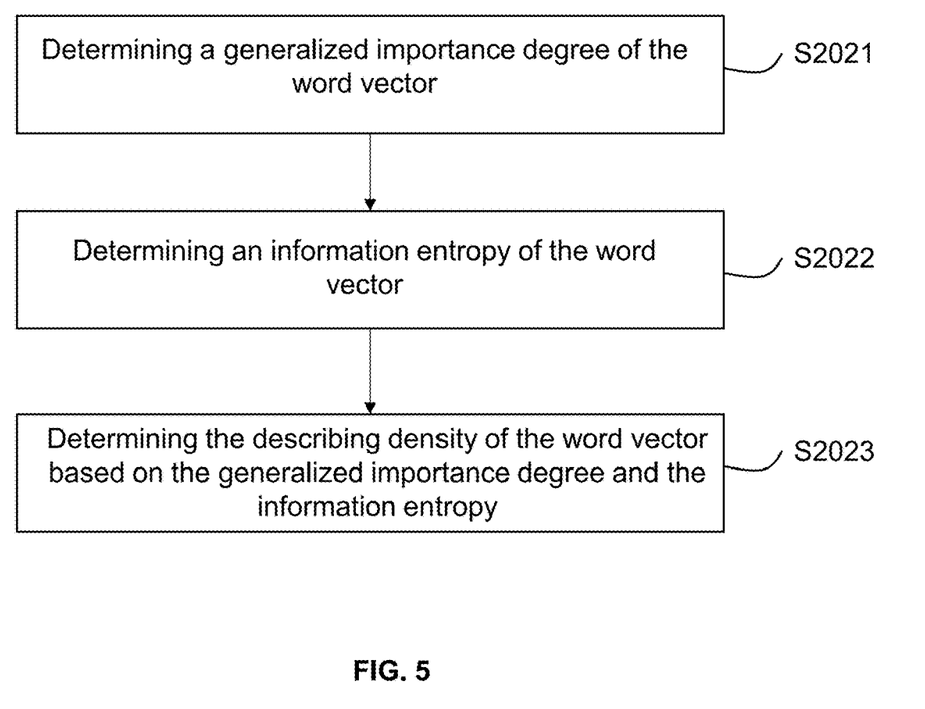
FIG. 5 is a flowchart illustrating an exemplary process for determining a describing density of a word vector according to some embodiments of the present disclosure.

FIG. 5 is a flowchart illustrating an exemplary process for determining a describing density of a word vector according to some embodiments of the present disclosure. As shown in FIG. 5, the obtaining a describing density of a word vector may include the following operations.

In S2021, a generalized importance degree of the word vector is determined.

The generalized importance degree refers to a normalized sum of paragraph levels at which the word is located. The higher the paragraph level at which the word in the word vector is located, e.g., the more the word appears in a root paragraph, the greater the generalized importance degree of the word vector.

In this operation, a generalized importance degree I of the word vector is determined. In general, the higher a frequency of a certain word vector appears in the text, the higher a relevance of a text description content to the word. However, for a highly structured text generated by a large model, different positions of the word have different importance degrees to the text description. To accurately obtain the generalized importance degree of a particular word to the text, an analysis needs to be performed combined with structural information.

Exemplarily, the processor first calculates a count of zeros within the paragraph tag of each word in the text and normalize the count to obtain $n^z$; sums the $n^z$ of each word cumulatively and then divide the sum by a count of occurrences w of the current word vector in the current text, to obtain the generalized importance degree I of the current word vector.

In S2022, an information entropy of the word vector is determined.

In this operation, an information entropy H of the current word vector is determined. The information entropy H is an information entropy of the current word vector and word vectors at adjacent positions in the current text. The information entropy H measure uncertainty of a random variable. In a natural language processing, it may indicate an unexpectedness degree or an information amount of a word in a particular context. The higher the information entropy H, the more uncertain the context of the current word vector, i.e., the more informative the word vector. The lower the information entropy H, the more predictable the context of the current word vector, i.e., the less informative the word vector. The information entropy H may be calculated based on a word co-occurrence statistics.

In S2023, the describing density of the word vector is determined based on the generalized importance degree and the information entropy.

In this operation, a describing density ρ of the current word vector is determined based on the generalized importance degree I and the information entropy H of the current word vector. The describing density ρ is positively correlated with the generalized importance degree I and negatively correlated with the information entropy H. Exemplarily, the describing density ρ of the current word vector is determined by an equation 1 as follows:

$$\rho = \frac{I}{H + 0.01} \times m \quad (1)$$

wherein m denotes a ratio of the count of occurrences of the current word vector in the current text to a total count of occurrences of the text word vector; adding H to 0.01 is to avoid a special case where the information entropy appears to be zero.

For the structured text, the importance degrees of the texts at different positions are different: the less a level count of a paragraph node in a paragraph forest, the higher a probability that the paragraph node is a generalized description, and when the word appears in such a paragraph, compared to other words, the word is more important. Therefore, by representing the level count where the word is located as $n^z$, and the level count is summed up and compared to the count of occurrences of the word to obtain I. The greater the value, the stronger an generalization ability of the word vector is in the structure feature of the text.

Additionally, to reduce effect of an insubstantial modifier on the describing density ρ, an insubstantial probability of the current word vector is analyzed by calculating the information entropies H of the current word vector and the word vectors of the adjacent words. Adjacent contexts of the insubstantial modifier are usually unpredictable in the text representing specific information, so the uncertainty of the adjacent words is represented by calculating the information entropies, and the greater the result, the more likely that the current word is the insubstantial modifier.

The describing density ρ of the current word vector in the current text is obtained after correcting m by I/H.

Figure 6:
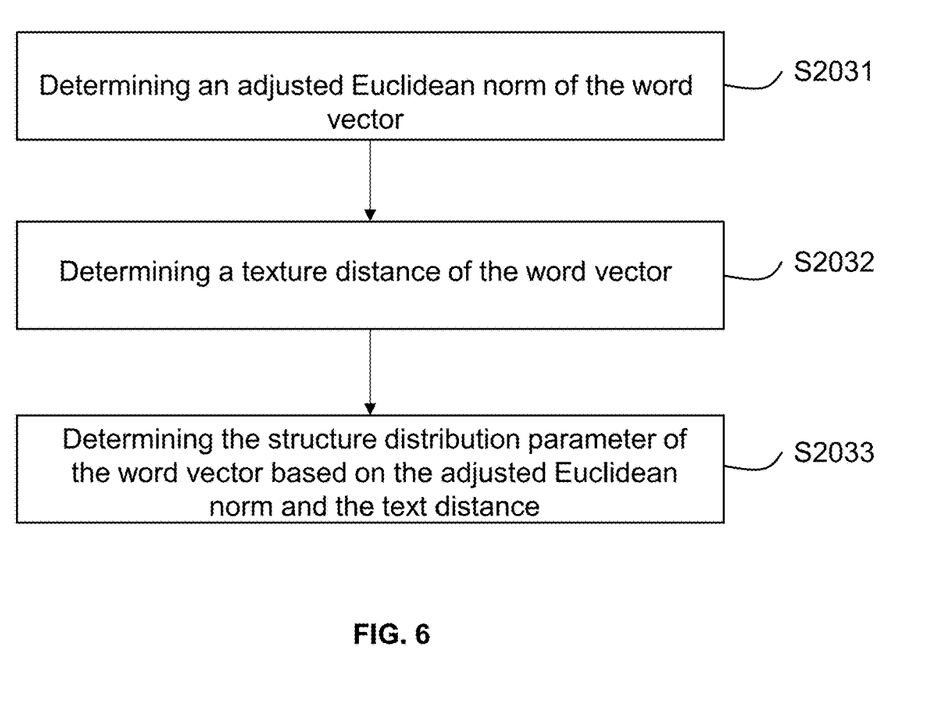
FIG. 6 is a flowchart illustrating an exemplary process for determining a structure distribution parameter of a word vector according to some embodiments of the present disclosure.

FIG. 6 is a flowchart illustrating an exemplary process for determining a structure distribution parameter of a word vector according to some embodiments of the present disclosure. As shown in FIG. 6, the determining a structure distribution parameter of a word vector may include the following operations.

In S2031, an adjusted Euclidean norm of the word vector is determined.

The adjusted Euclidean norm of the word vector includes an adjusted Euclidean norm for each word of the word vector that occurs in the current text. In this operation, the processor determines an adjusted Euclidean norm $\|p_i\|$ for each word of the current word vector i. The adjusted Euclidean norm $\|p_i\|$ refers to a normalized Euclidean norm for each word of the current word vector i. The Euclidean norm refers to a sum of two paragraph levels of one word of the current word vector i and a next adjacent word of the current word vector i. Exemplarily, the processor obtains the adjusted Euclidean norm of the current word vector i by normalizing a sum of a count of all descendant nodes of the two corresponding nodes of the paragraph tags of any two adjacent words of the current word vector, and obtains the adjusted Euclidean norm $\|p_i\|$ of each word of the current word vector i. The greater the value, the higher the probability that the current word vector i serves as a generalized and important thematic word in the current text.

In S2032, the text distance of the word vector is determined.

The text distance of the word vector includes a text distance of the word vector in each word that appears in the current text. In this operation, a text distance $d_i$ is determined for each word of the current word vector i. The text distance $d_i$ of the current word vector i denotes a paragraph number difference between paragraph positions of any two adjacent current word vector i. The greater the value, the more sparsely the current word vector i is distributed in the current text, then the higher the probability that the word vector is used as the thematic word throughout the current text.

In S2033, a structure distribution parameter of the word vector is determined based on the adjusted Euclidean norm and the text distance.

In this operation, a structure distribution parameter F of the word vector i is determined based on an adjusted Euclidean norm $\|p_i\|$ and the text distance $d_i$. The structure distribution parameter F is a sum of products of the adjusted Euclidean norm $\|p_i\|$ and the text distance $d_i$ for each word of the current word vector. Exemplarily, the structure distribution parameter F of the current word vector i is determined by an equation (2) as follows:

$$F = \sum_{i=1}^{w} (\|p_i\| \times d_i) \quad (2)$$

wherein w denotes the count of occurrences of the current word vector i in the current text minus one.

The greater the structure distribution parameter F of the word vector i is, the more important and widespread the distribution of the current word vector i in the current text, and the higher the probability that the word vector serves as an important thematic word throughout the current text.

Figure 7:
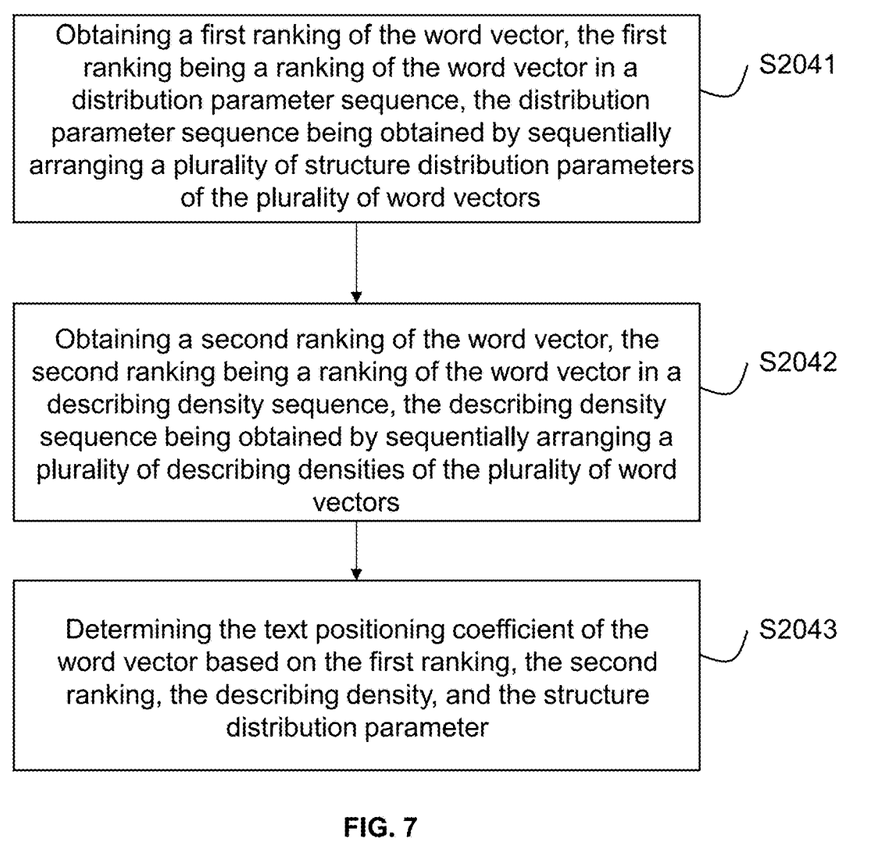
FIG. 7 is a flowchart illustrating an exemplary process for determining a text positioning coefficient of a word vector according to some embodiments of the present disclosure.

FIG. 7 is a flowchart illustrating an exemplary process for determining a text positioning coefficient of a word vector according to some embodiments of the present disclosure. As shown in FIG. 7, the determining a text positioning coefficient of a word vector may include the following operations.

In S2041, a first ranking of the word vector is obtained. The first ranking is a ranking of the word vector in a distribution parameter sequence, the distribution parameter sequence is obtained by sequentially arranging a plurality of structure distribution parameters of the plurality of word vectors.

In some embodiments, the distribution parameter sequence is referred to as a structure distribution parameter sequence.

In this operation, a first ranking $A_c$ of a word vector c is obtained. The first ranking $A_c$ is a ranking of the word vector c in the distribution parameter sequence A. The distribution parameter sequence A is obtained by arranging structure distribution parameters of the plurality of word vectors from smallest to greatest.

In S2042, a second ranking of the word vector is obtained. The second ranking is a ranking of the word vector in a describing density sequence, and the describing density sequence is obtained by sequentially arranging a plurality of describing densities of the plurality of word vectors.

In this operation, a second ranking $B_c$ of the word vector c is obtained. The second ranking $B_c$ is a ranking of the word vector c in a describing density sequence B. The describing density sequence B is obtained by arranging the descriptive densities of the plurality of word vectors from smallest to greatest.

In S2043, the text positioning coefficient of the word vector is determined based on the first ranking, the second ranking, the describing density, and the structure distribution parameter.

In this operation, a text positioning coefficient T of the word vector c is determined based on the first ranking $A_c$, the second ranking $B_c$, the describing density $\rho$, and the structure distribution parameter F. The text positioning coefficient is proportional to the first ranking, the describing density, and the structure distribution parameter, and inversely proportional to the second ranking. Exemplarily, the text positioning coefficient T of the word vector c is obtained from an equation 3 as follows:

$$T = \frac{A_c}{B_c} \times (\rho \times F) \quad (3)$$

wherein the greater ($\rho \times F$), the higher a probability that a current word represents an important thematic content in the current text.

For part of the interpretable word vectors, the describing densities may be relatively low, and further determination needs to be performed by combining a penetration of the structure distribution parameter.

$$\frac{A_c}{B_c}$$

indicates a relative size of the structure distribution parameter and the describing density of the word vector c in the current text: when the describing density of the word vector c is relatively low and the structure distribution parameter is relatively great, the greater $$\frac{A_c}{B_c}$$

a wider range of distributions the word vector c has under less distribution quantity (count of occurrences), and the higher the probability that the current word is able to represent important thematic content. To compensate for the disadvantage of $\rho$ in a process of text positioning calculation, the text positioning coefficient T of the current word vector is obtained after adjusting $$\frac{A_c}{B_c}.$$

The greater the text positioning coefficient T, the higher the probability of the current word to be the important thematic content.

Figure 8:
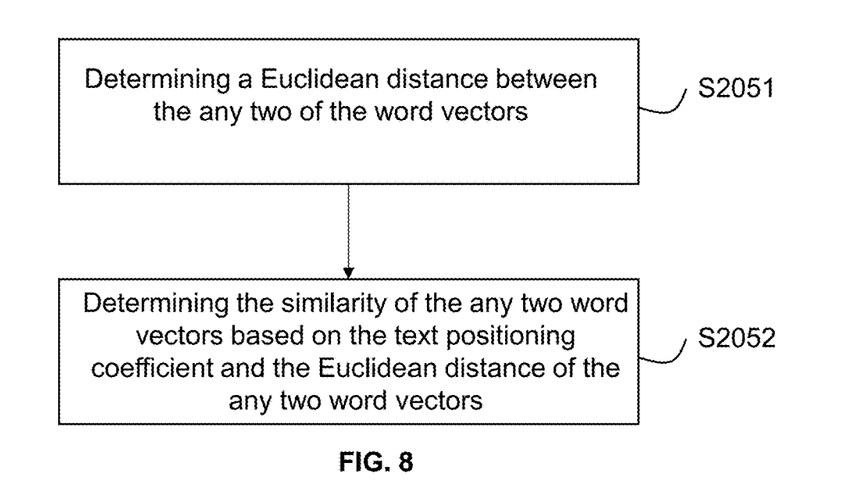
FIG. 8 is a flowchart illustrating an exemplary process for determining a similarity of any two word vectors according to some embodiments of the present disclosure.

FIG. 8 is a flowchart illustrating an exemplary process for determining a similarity of any two word vectors according to some embodiments of the present disclosure. As shown in FIG. 8, the determining a similarity of any two word vectors may include the following operations.

In S2051, a Euclidean distance between the any two of the word vectors is determined.

In this operation, a Euclidean distance $\|\alpha_a, \alpha_b\|$ of any two word vectors a and b is determined. The Euclidean distance $\|\alpha_a, \alpha_b\|$ indicates a similarity of the any two word vectors a and b. The smaller the Euclidean distance, the higher the similarity. Commonly used manners for calculating the similarity of word vectors include a cosine similarity, the Euclidean distance, a dot product, a Manhattan distance, or the like.

In S2052, the similarity of the any two word vectors is determined based on a text positioning coefficient and the Euclidean distance between the any two word vectors.

In this operation, the similarity d(a,b) of the any two word vectors a and b is determined based on the text positioning coefficients $T_a$ and $T_b$ and the Euclidean distance $\|\alpha_a, \alpha_b\|$ of the word vectors a and b. The similarity is negatively correlated with the Euclidean distance and positively correlated with a difference between the text positioning coefficients of the two word vectors. Exemplarily, the similarity d(a,b) of the any two word vectors a and b may be determined by an following equation 4:

$$d(a,b) = \sqrt{(T_a - T_b)^2 + 1/(1 + \|\alpha_a, \alpha_b\|)} \quad (4)$$

In some embodiments, the similarity d(a,b) of the any two word vectors a and b is also understood as an inverse of the distance between the any two word vectors a and b.

Figure 9:
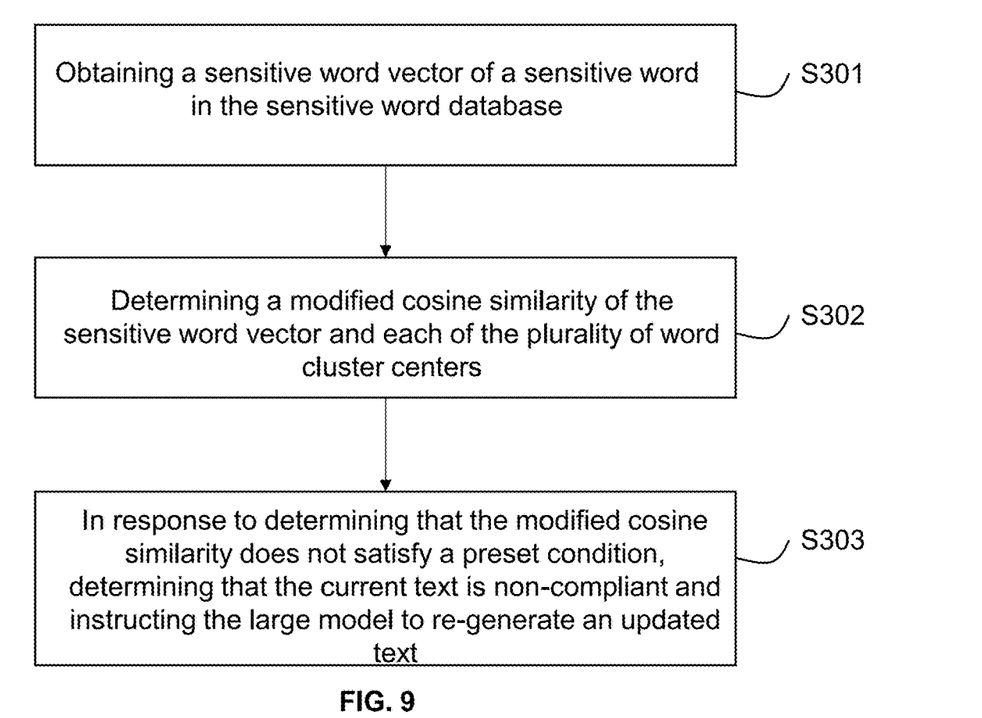
FIG. 9 is a flowchart illustrating an exemplary process for determining whether a current text is compliant according to some embodiments of the present disclosure.

FIG. 9 is a flowchart illustrating an exemplary process for determining whether a current text is compliant according to some embodiments of the present disclosure. As shown in FIG. 9, the determining whether a current text is compliant may include the following operations.

In S301, a sensitive word vector of a sensitive word in a sensitive word database is obtained.

In this operation, the sensitive word in the sensitive word database is converted into the sensitive word vector. Exemplarily, a process of converting the sensitive word into the sensitive word vector may be found in an embodiment in operation S10, which is not repeated herein.

In S302, a modified cosine similarity of the sensitive word vector and each of the plurality of word cluster centers is determined.

In this operation, the modified cosine similarity of the sensitive word vector and each of the plurality of word cluster centers is determined. A calculation of the modified cosine similarity is performed by an improved cosine similarity calculation manner, which is mainly used to solve a problem of bias of a traditional cosine similarity in scoring data due to different scales of the users' ratings. Exemplarily, the processor calculates the modified cosine similarity based on the cosine similarity of the sensitive word vector and the cluster center.

In S303, in response to determining that the modified cosine similarity does not satisfy a preset condition, the current text is determined to be non-compliant and a large model is instructed to re-generate an updated text.

The preset condition is associated with a preset threshold. For example, the precondition is that any one of the modified cosine similarities is less than the preset threshold. Exemplarily, the preset threshold is 0.65, and an implementer set a size of the preset threshold according to specific practical situations.

In this operation, when any one of the modified cosine similarities does not satisfy the preset condition, it may be determined that the modified cosine similarity does not satisfy the preset condition, and the current text is non-compliant and is not to be displayed. Further, the large model is instructed to re-generate the updated text. The updated text refers a text regenerated by the large model. The updated text does not include recognized sensitive words. Exemplarily, when at least one of the modified cosine similarities is greater than the preset threshold, the processor determines that the modified cosine similarity does not satisfy the preset condition, and the current text is non-compliant and is not to be displayed. Further, the large model is instructed to re-generate the current text. When any one of the modified cosine similarities is less than the preset threshold, the processor determines that the modified cosine similarity satisfies the preset condition, and the current text is compliant and is to be displayed.

In some embodiments, after generating the update text, the processor then performs the operations in FIG. 1 to confirm whether the updated text is compliant, until, in response to determining that any one of the modified cosine similarities satisfies the preset condition, it is determined that the updated text is compliant and the updated text is displayed.

In summary, the embodiments of the present disclosure cluster the word vectors according to the importance of the word vectors, and then combine the word cluster centers of the word clusters obtained by clustering with the sensitive word database to determine whether the current text is compliant, thereby reducing the occurrence of a false detection or a missed detection, and improving an accuracy of a detection result.

Figure 10:
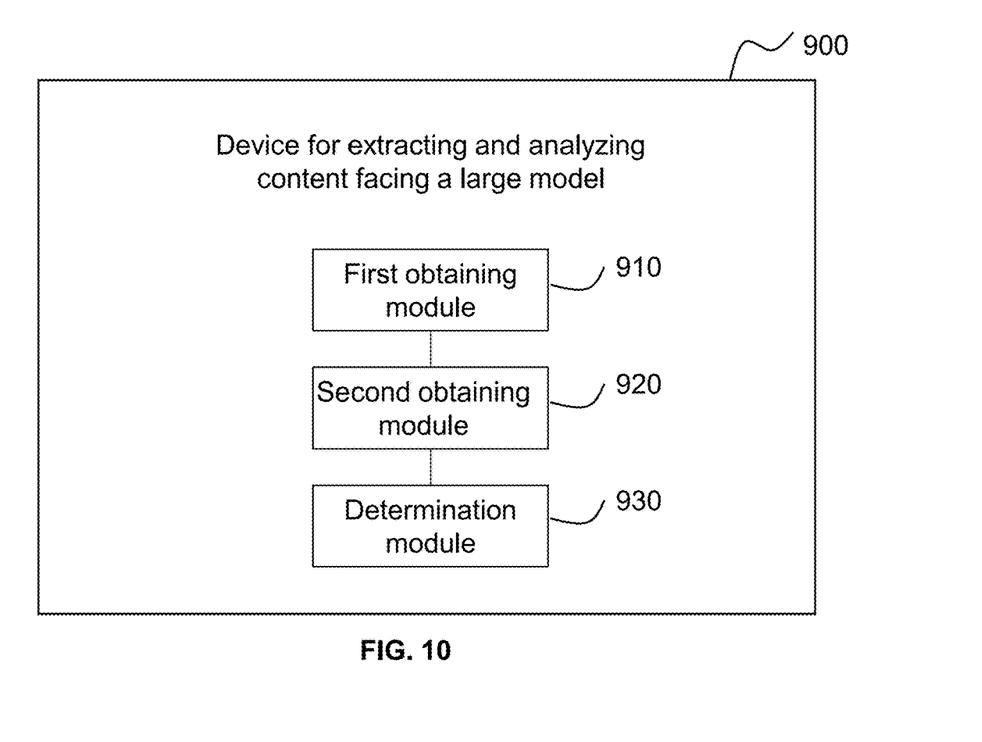
FIG. 10 is a block diagram illustrating an exemplary device for extracting and analyzing content facing a large model according to some embodiments of the present disclosure.

FIG. 10 is a block diagram illustrating an exemplary device for extracting and analyzing content facing a large model according to some embodiments of the present disclosure. As shown in FIG. 10, embodiments of the present disclosure provide the device for extracting and analyzing content facing the large model, and the device may include a first obtaining module 910, a second obtaining module 920, and a determination module 930.

The first obtaining module 910 is configured to preprocess a current text generated by the large model to obtain a plurality of word vectors of the current text, the large model is a machine learning model.

The second obtaining module 920 is configured to obtain a plurality of word cluster centers by clustering the plurality of word vectors according to an importance of the plurality of word vectors.

The determination module 930 is configured to determine whether the current text is compliant based on the plurality of word cluster centers and a sensitive word database.

In some embodiments, the second obtaining module 920 is further configured to: for each of the plurality of word vectors, determine a paragraph tag of the word vector based on a paragraph position relationship of the current text; determine a describing density of the word vector based on the paragraph tag; determine a structure distribution parameter of the word vector; and determine a text positioning coefficient of the word vector based on the describing density and the structure distribution parameter; determine a similarity of any two of the plurality of word vectors based on a plurality of text positioning coefficients of the plurality of word vectors; and by clustering the plurality of word vectors based on the similarity, obtain the plurality of word cluster centers.

In some embodiments, the second obtaining module 920 is further configured to: obtain a first line indentation of a plurality of paragraphs of the current text; determine a describing type of the plurality of paragraphs based on the first line indentation; determine a text structure of the current text based on the describing type; and determine the paragraph tag of the word vector based on the text structure.

In some embodiments, the second obtaining module 920 is further configured to: determine a generalized importance degree of the word vector; determine an information entropy of the word vector; and determine the describing density of the word vector based on the generalized importance degree and the information entropy.

In some embodiments, the second obtaining module 920 is further configured to: determine an adjusted Euclidean norm of the word vector; determine a text distance of the word vector; and determine the structure distribution parameter of the word vector based on the adjusted Euclidean norm and the text distance.

In some embodiments, the second obtaining module 920 is further configured to: obtain a first ranking of the word vector, the first ranking being a ranking of the word vector in a distribution parameter sequence, and the distribution parameter sequence being obtained by sequentially arranging a plurality of structure distribution parameters of the plurality of word vectors; obtain a second ranking of the word vector, the second ranking being a ranking of the word vector in a describing density sequence, and the describing density sequence being obtained by sequentially arranging a plurality of describing densities of the plurality of word vectors; and determine the text positioning coefficient of the word vector based on the first ranking, the second ranking, the describing density, and the structure distribution parameter.

In some embodiments, the second acquisition module 920 is further configured to: determine a Euclidean norm of any two word vectors; based on the text positioning coefficients and the Euclidean norm of any two word vectors, determine a similarity.

In some embodiments, the determining module 930, is further configured to: obtain sensitive word vectors for sensitive words in the sensitive word pool; determine a modified cosine similarity of the sensitive word vectors to the center of the plurality of word clusters; in response to the modified cosine similarity does not satisfy a predetermined condition, determining that the current text is non-compliant and instructing the large model to regenerate updated text.

In summary, the device for extracting and analyzing content facing a large model provided by embodiments of the present disclosure performs a clustering on the word vectors according to the importance degree of the word vectors, and then the word cluster centers obtained from the clustering are combined with a sensitive word database to determine whether the current text is in compliance. The device may therefore reduce the occurrence of a false detection or a missed detection and improve the accuracy of the detection result.

The present disclosure further provides a computer-readable storage medium stored with computer program instructions. When a computer reads the computer instructions, the computer executes the operations of the method for extracting and analyzing content facing the large model.

Figure 11:
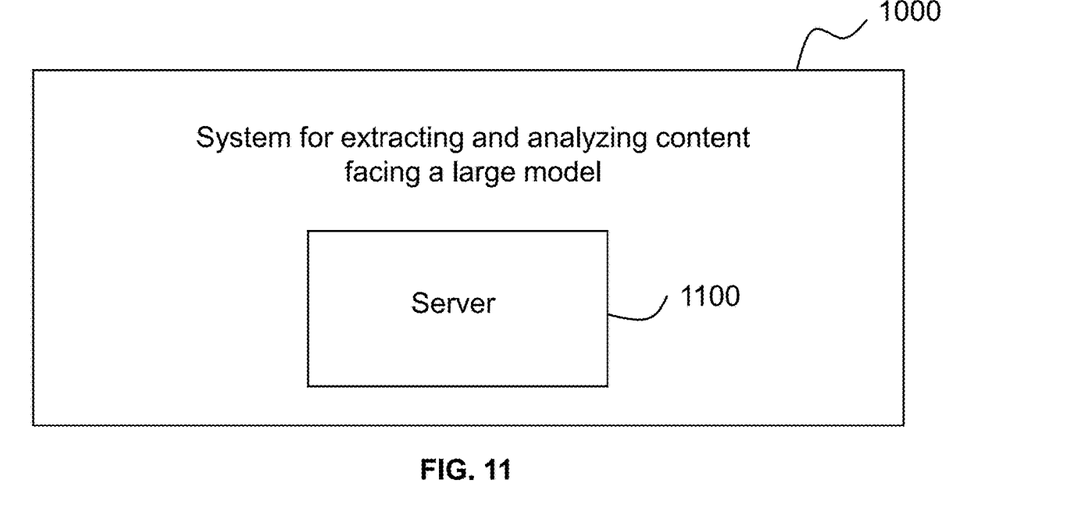
FIG. 11 is a block diagram illustrating an exemplary system for extracting and analyzing content facing a large model according to some embodiments of the present disclosure.

FIG. 11 is a block diagram illustrating an exemplary system for extracting and analyzing content facing a large model according to some embodiments of the present disclosure. As shown in FIG. 11, embodiments of the present disclosure provide a system for extracting and analyzing content facing a large model 1000 including a server 1100.

Figure 12:
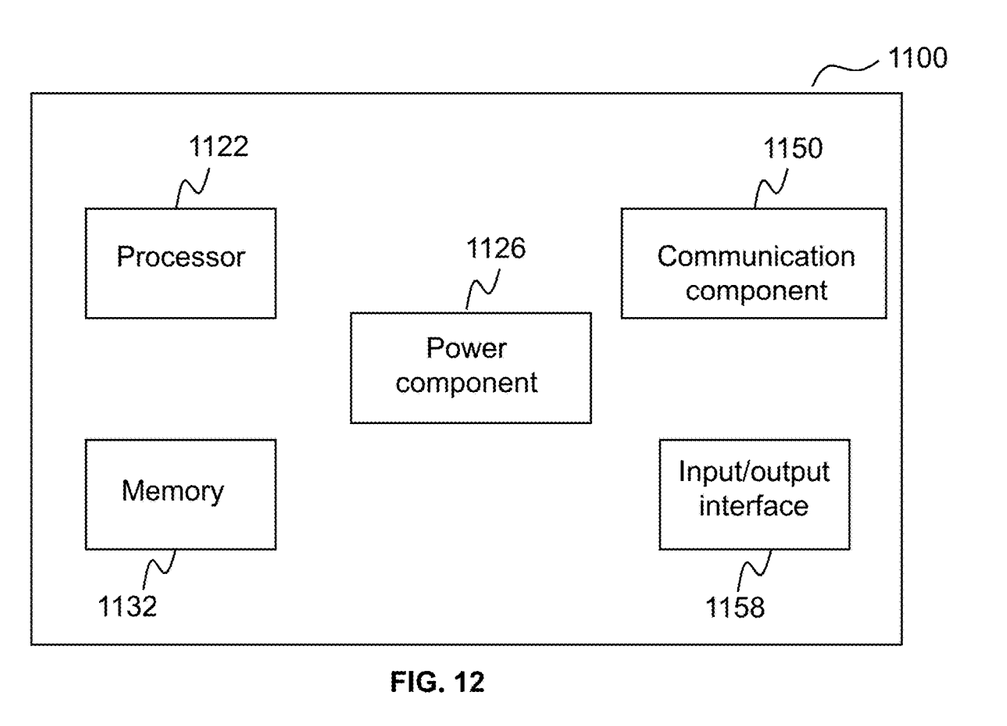
FIG. 12 is a block diagram illustrating an exemplary server according to some embodiments of the present disclosure.

FIG. 12 is a block diagram illustrating an exemplary server according to some embodiments of the present disclosure. As shown in FIG. 12, the server 1100 includes a processor 1122. The processor 1122 further includes one or more processors and memory resources represented by a memory 1132 for storing instructions, such as an application program, which is able to be performed by the processor 1122. The application program stored in the memory 1132 may include one or more modules each corresponding to a set of instructions. In addition, the processor 1122 is configured to perform the instructions to perform the operations: by preprocessing a current text generated by the large model, obtaining a plurality of word vectors of the current text, the large model being a machine learning model; by clustering the plurality of word vectors according to an importance of the plurality of word vectors, obtaining a plurality of word cluster centers; and determining whether the current text is compliant based on the plurality of word cluster centers and a sensitive word database.

The server 1100 may further include a power component 1126 configured to perform a power management for the server 1100, a communication component 1150 configured to connect the server 1100 to a network, and an input/output interface 1158. The server 1100 may operate an operating system stored in the memory 1132.

In another exemplary embodiment, a computer program product including a computer program capable of being performed by a programmable electronic device is provided. When performed by the programmable electronic device, the computer program has a code portion used to perform the method for extracting and analyzing content facing the large model.

In some embodiments, the method for extracting and analyzing content facing a large model includes: by preprocessing a current text generated by the large model, obtaining a plurality of word vectors of the current text; by clustering the plurality of word vectors according to an importance of the plurality of word vectors, obtaining a plurality of word cluster centers; and determining whether the current text is compliant based on the plurality of word cluster centers and a sensitive word database.

In some embodiments, the obtaining a plurality of word cluster centers includes: setting a paragraph tag of the word vector based on a paragraph position relationship of the current text; obtaining a describing density of the word vector based on the paragraph tag; obtaining a structure distribution parameter of the word vector based on the describing density; and obtaining a text positioning coefficient of the word vector based on the describing density and the structure distribution parameter; determining a similarity of any two of the plurality of word vectors based on a plurality of text positioning coefficients; and by clustering the plurality of word vectors based on the similarity, obtaining the plurality of word cluster centers.

In some embodiments, the obtaining a text positioning coefficient of the word vector includes: obtaining a first ranking of the word vector, the first ranking being a ranking of the word vector in a distribution parameter sequence, the distribution parameter sequence being obtained by sequentially arranging a plurality of structure distribution parameters of the plurality of word vectors; obtaining a second ranking of the word vector, the second ranking being a ranking of the word vector in a describing density sequence, the describing density sequence being obtained by sequentially arranging a plurality of describing densities of the plurality of word vectors; and determining the text positioning coefficient of the word vector based on the first ranking, the second ranking, the describing density, and the structure distribution parameter.

In some embodiments, the determining whether the current text is compliant includes: converting the sensitive words in the sensitive database into sensitive word vectors; obtaining a modified cosine similarity between the sensitive word vectors and the plurality of word cluster centers; in response to determining that the modified cosine similarity is greater than a preset threshold, determining that the current text is non-compliant, and is not to be displayed. Further, the large model is instructed to re-generate an updated text.

The above-described embodiments express only several embodiments of the present disclosure, which are described in a more specific and detailed manner, but are not to be construed as limiting the scope of the present disclosure. It should be noted that, for those skilled in the art, several deformations and improvements may be made without departing from the conception of the present disclosure, all of which fall within the scope of protection of the present disclosure.

What is claimed is:

1. A method for extracting and analyzing content facing a large model, wherein the method comprises:
   by preprocessing a current text generated by the large model, obtaining a plurality of word vectors of the current text;
   by clustering the plurality of word vectors according to an importance degree of the plurality of word vectors, obtaining a plurality of word cluster centers; and
   determining whether the current text is compliant based on the plurality of word cluster centers and a sensitive word database, wherein
   the obtaining a plurality of word vectors of the current text comprises:

determining a paragraph tag of the word vector based on a paragraph position relationship of the current text;
determining a describing density of the word vector based on the paragraph tag;
determining a structure distribution parameter of the word vector; and
determining a text positioning coefficient of the word vector based on the describing density and the structure distribution parameter;
determining a similarity of any two of the plurality of word vectors based on a plurality of text positioning coefficients of the plurality of word vectors; and
by clustering the plurality of word vectors based on the similarity, obtaining the plurality of word cluster centers.

2. The method of claim 1, wherein the determining a paragraph tag of the word vector based on a paragraph position relationship of the current text includes:
obtaining a first line indentation of a plurality of paragraphs of the current text;
determining a describing type of the plurality of paragraphs based on the first line indentation;
determining a text structure of the current text based on the describing type; and
determining the paragraph tag of the word vector based on the text structure.

3. The method of claim 1, wherein the determining a describing density of the word vector based on the paragraph tag includes:
determining a generalized importance degree of the word vector;
determining an information entropy of the word vector; and
determining the describing density of the word vector based on the generalized importance degree and the information entropy.

4. The method of claim 1, wherein the determining a structure distribution parameter of the word vector includes:
determining an adjusted Euclidean norm of the word vector;
determining a text distance of the word vector; and
determining the structure distribution parameter of the word vector based on the adjusted Euclidean norm and the text distance.

5. The method of claim 1, wherein the determining a text positioning coefficient of the word vector includes:
obtaining a first ranking of the word vector, the first ranking being a ranking of the word vector in a distribution parameter sequence, the distribution parameter sequence being obtained by sequentially arranging a plurality of structure distribution parameters of the plurality of word vectors from small to large;
obtaining a second ranking of the word vector, the second ranking being a ranking of the word vector in a describing density sequence, the describing density sequence being obtained by sequentially arranging a plurality of describing densities of the plurality of word vectors from small to large; and
determining the text positioning coefficient of the word vector based on the first ranking, the second ranking, the describing density, and the structure distribution parameter.

6. The method of claim 1, wherein the determining a similarity of any two of the plurality of word vectors includes:
determining a Euclidean norm between the any two of the word vectors; and
determining the similarity of the any two word vectors based on the text positioning coefficient and the Euclidean norm between the any two word vectors.

7. The method of claim 1, wherein the determining whether the current text is compliant includes:
transforming a sensitive word in the sensitive word database to the sensitive word vector;
determining a modified cosine similarity of the sensitive word vector and each of the plurality of word cluster centers; and
in response to determining that the modified cosine similarity is greater than a preset threshold, determining that the current text is non-compliant and is not to be displayed, and instructing the large model to re-generate an updated text.

8. A device for extracting and analyzing content facing a large model configured to implement operations of the method according to claim 1, wherein the device comprises:
a first obtaining module configured to obtain a plurality of word vectors of the current text by preprocessing a current text generated by the large model;
a second obtaining module configured to obtain a plurality of word cluster centers by clustering the plurality of word vectors according to an importance of the plurality of word vectors; and
a determination module configured to determine whether the current text is compliant based on the plurality of word cluster centers and a sensitive word database.

9. A system for extracting and analyzing content facing a large model, wherein the system includes a server comprising:
a memory storing a computer program;
a processor configured to perform the computer program in the memory to implement operations of:
by preprocessing a current text generated by the large model, obtaining a plurality of word vectors of the current text;
by clustering the plurality of word vectors according to an importance of the plurality of word vectors, obtaining a plurality of word cluster centers; and
determining whether the current text is compliant based on the plurality of word cluster centers and a sensitive word database, wherein
the obtaining a plurality of word vectors of the current text comprises:
determining a paragraph tag of the word vector based on a paragraph position relationship of the current text;
determining a describing density of the word vector based on the paragraph tag;
determining a structure distribution parameter of the word vector; and
determining a text positioning coefficient of the word vector based on the describing density and the structure distribution parameter;
determining a similarity of any two of the plurality of word vectors based on a plurality of text positioning coefficients of the plurality of word vectors; and
by clustering the plurality of word vectors based on the similarity, obtaining the plurality of word cluster centers.

* * * * *